United States Patent [19]

Betts et al.

[11] Patent Number: 4,631,738
[45] Date of Patent: Dec. 23, 1986

[54] GAIN TRACKER FOR DIGITAL MODEM

[75] Inventors: William L. Betts, St. Petersburg; Edward Zuranski, Largo, both of Fla.

[73] Assignee: Paradyne Corporation, Largo, Fla.

[21] Appl. No.: 678,652

[22] Filed: Dec. 6, 1984

[51] Int. Cl.[4] ............................................. H04L 27/08
[52] U.S. Cl. ........................................ 375/98; 375/39; 375/118; 455/245
[58] Field of Search ................ 375/14, 39, 98, 118, 375/119, 120, 83, 86; 330/278, 279, 284; 328/173, 175; 381/107, 108; 455/234, 245, 249, 276, 303, 304; 358/174

[56] References Cited

U.S. PATENT DOCUMENTS

| 4,253,184 | 2/1981 | Gitlin et al. | 375/14 |
| 4,320,526 | 3/1982 | Gitlin | 375/118 |
| 4,532,640 | 7/1985 | Bremer et al. | 375/39 |
| 4,555,790 | 11/1985 | Betts et al. | 375/39 |

Primary Examiner—Benedict V. Safourek
Attorney, Agent, or Firm—Kane, Dalsimer, Kane, Sullivan & Kurucz

[57] ABSTRACT

A phase and gain corrector is described for a modem for receiving QAM or PSK-encoded signals. An ideal vector corresponding to the received vector is generated and the difference or error vector is resolved into a radial component in the direction of the ideal vector a tangential component. A gain corrector and a phase corrector variable are calculated from said radial and tangential components of the error vector and used to correct the gain and phase of the received signals.

4 Claims, 5 Drawing Figures

GAIN TRACKER FOR DIGITAL MODEM

BACKGROUND OF THE INVENTION a. Field of Invention

This invention pertains to digital modems and more particularly to a digital modem using QAM type modulation and having automatic error correction.

b. Description of the Prior Art

While in analog communication exchange errors caused by various interferences due to external causes or channel distortions can be usually tolerated, in digital data communications such errors can have grave consequences and therefore great and painstaking efforts have to be made to minimize them. For example many modems are provided with automatic gain control (AGC) circuits which monitor the amplitude levels of the received signals and an output to the demodulator section of a receiver. The AGC gain is dynamically adjusted to try to maintain said output within a preselected amplitude range. However it was found that for relatively fast excursions of the received signals, these AGC circuits are ineffective.

OBJECTIVES AND SUMMARY OF THE INVENTION

In view of the above it is an objective of the present invention to provide a modem with a gain tracker for automatically compensating for fast rising error signals.

A further objective is to provide a modem with a tracker circuit which is also adapted to eliminate gain hit errors.

Other objectives and advantages of the circuit shall become apparent from the following description of the invention.

In a modem constructed in accordance with the present invention, each received signal is compared to an ideal or reference signal and the difference or error signal is resolved into a radial and an angular error component. The angular component is used to rotate the received signals while the radial error is used to compensate for the rapid excursions in the amplitude of the signals. Integrators are used on both error components as a means of smoothing the signal.

DETAILED DESCRIPTION OF THE INVENTION

Figure 1:
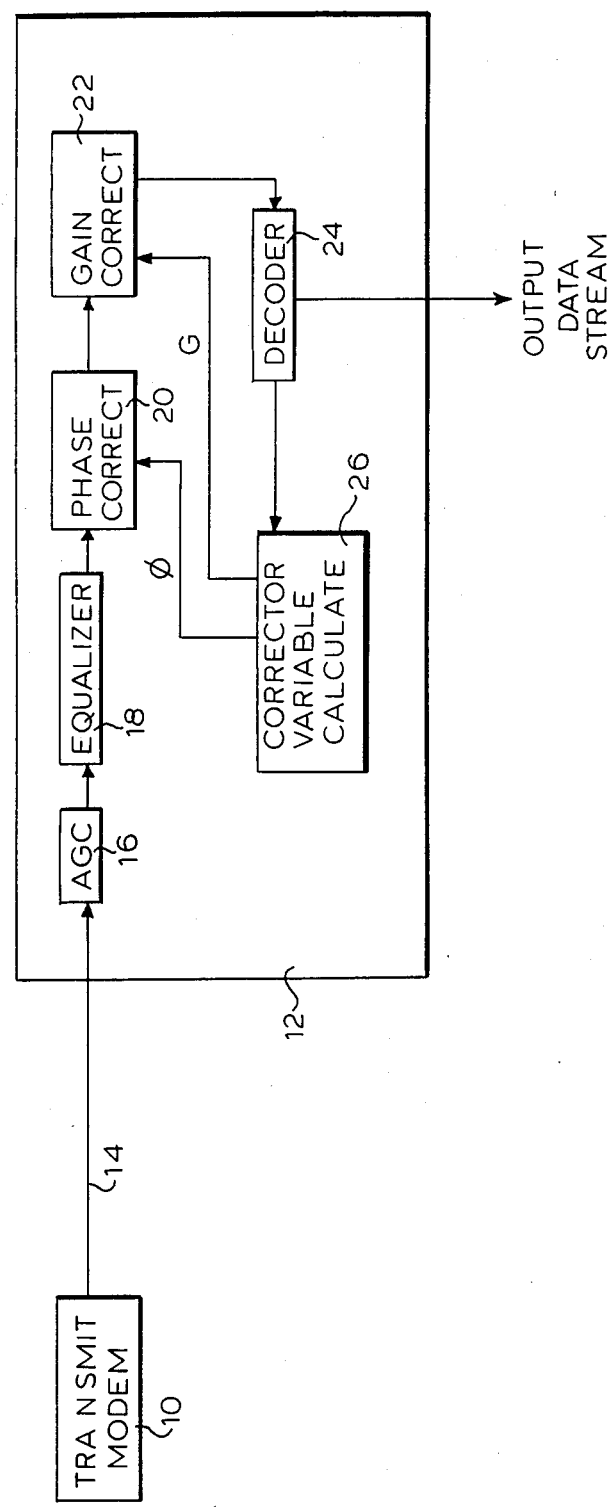
FIG. 1 shows a receiver modem constructed in accordance with the present invention.

Typically digital data is transmitted from a first, transmitting modem 10, to a second, receiving modem 12 over a communication channel 14. While various schemes are presently available, as it shall become apparent from the description below, this invention is directed toward modems using quadrature amplitude modulation. Furthermore, while information can actually flow in both direction over channel 14, for the purposes of this invention, only the signal flow to modem 12 is discussed. Obviously the invention described herein is functional for modems operating in half- or full-duplex modes.

Within modem 12, the signals received from channel 14 are first passed through an automatic gain control circuit (AGC) 16, and an adaptive equalizer 18. As previously mentioned the AGC circuit is provided to adjust the amplitude of the received signal so that it falls within a preselected range. The equalizer 18 is provided to eliminate linear channel distortions in a manner well known in the art.

The equalized signals are then fed sequentially to a phase correct circuit 20 which rotates the equalized signal by a phase angle, which, as shall be described later is dependant on the phase error of the equalized signals. The phase corrected signals are then fed to a gain correct circuit 22 for correcting the gain of the received signals. The gain corrected signals are fed to a decoder 24. In the decoder 24 the signals are analyzed to determine the ideal or nominal signal vectors that correspond to the received signals and then a binary data stream is generated in the normal manner which corresponds to said ideal signal vectors in accordance with the particular QAM encoding scheme used by the system. The ideal signal vectors are also provided to a corrector variable configuration circuit 26 provided to generate the phase angle corrected variable $\phi$ and gain correction variable G fed to the respective phase and gain correct circuits 20 and 22 respectively.

Figure 2:
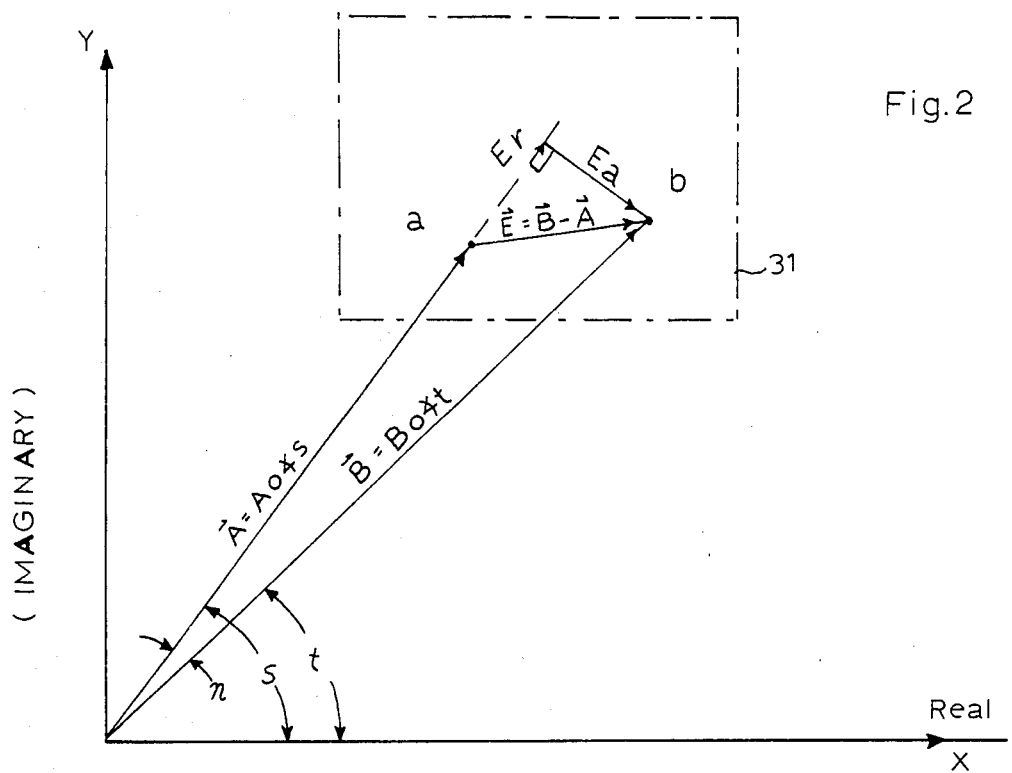
FIG. 2 shows a phasor diagram illustrating a signal received by the modem of FIG. 1, and its relation to an ideal signal and the difference or error signal between the actual and ideal signal.

The principle of operation of the invention is best explained in conjunction with the phasor diagram of FIG. 2. Wherein the horizontal axis is the real axis and the vertical axis is the imaginary axis. Typically the points characterizing a particular QAM-type scheme are mapped on the complex plane as a signal constellation. One such point is point "a" on FIG. 2. For the sake of clarity other points of the constellation have been omitted. A decision area 31 is drawn around point "a" to define the locus of the received signals which correspond to point "a". Thus for example if the decoder 24 of FIG. 1 is fed an equalized signal having components which correspond to point "b" on FIG. 2, then decoder 24 assumes that the signal corresponding to point "a" was sent by modem 10. Thus point "a" represents the ideal or nominal signal and "b" represents the actual received signal.

If the signals are represented by vectors A and B then their difference vector $E = B - A$ corresponds to the error signal. This error vector E can be resolved into two orthogonal components $E_r$ and $E_a$, $E_r$ being the radial error in the direction of ideal vector A and $E_a$ being the tangential error.

Figure 3:
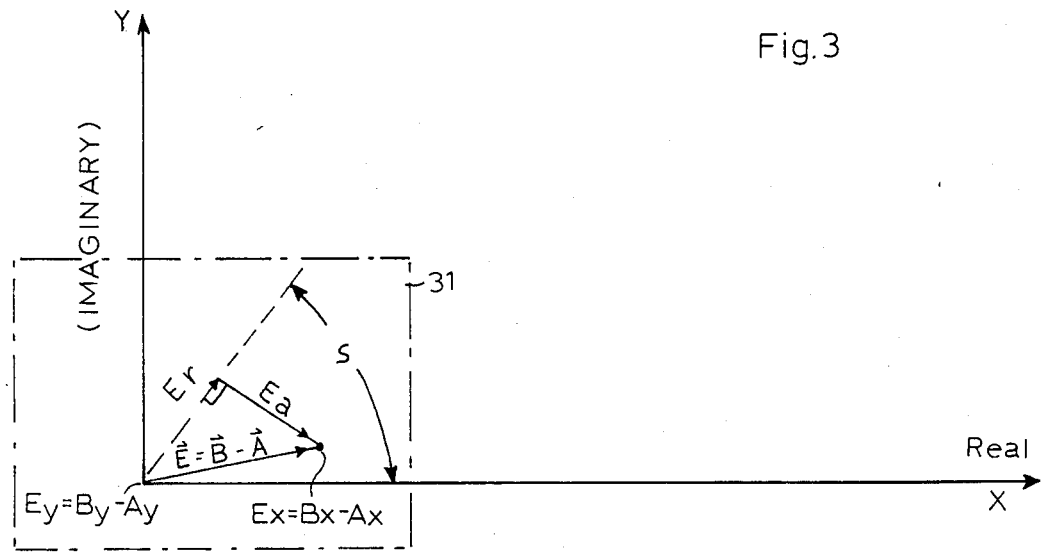
FIG. 3 shows an enlarged section of the diagram of FIG. 2.

As shown in FIG. 3, vector E also has a real and an imaginary component $E_x$ and $E_y$ being defined as $$E_x = B_x - A_x \text{ and} \tag{1}$$

$$E_y = B_y - A_y \tag{2}$$

wherein $A_x$, $A_y$, and $B_x$, $B_y$ are the real and imaginary components respectively of phasors A and B.

Figure 4:
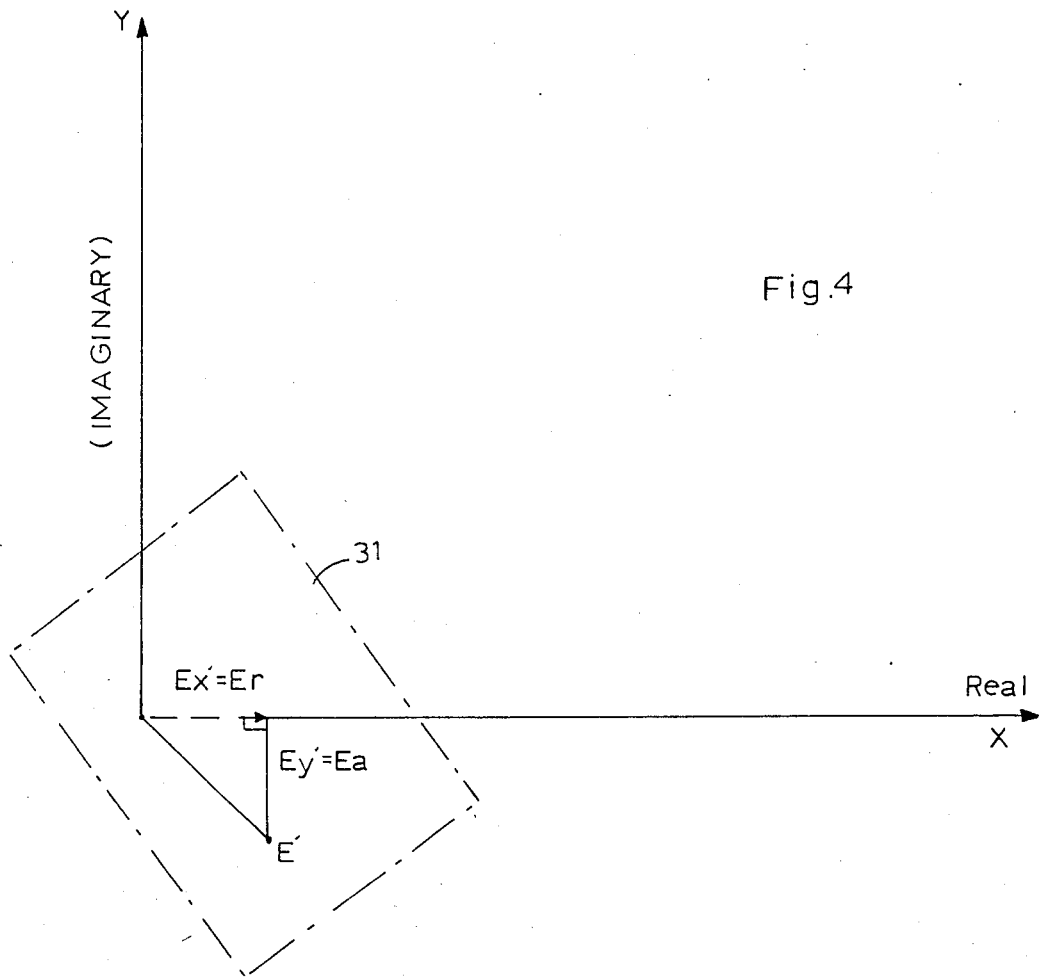
FIG. 4 shows the rotated error vector E'.

As shown in FIGS. 2 and 3, phasor A has an angle s. If phasor E is rotated by angle s, as shown in FIG. 4, to obtain a new phasor E', then the real and imaginary components of E' may be obtained as follows:

$$E' = E_x' + jE_y'; \text{ and} \tag{3}$$

$$E'=E\,e^{js}=(E_x+jE_y)(\cos s+j\sin s)=(E_x\cos s-E_y\sin s)+j(E_x\sin s+E_y\cos s) \quad (4)$$

However, since the real and imaginary components of E' are equal to the radial and angular components E as defined above, it follows that $$E_x'=E_r=E_x\cos s-E_y\sin s;\text{ and} \quad (5)$$

$$E_y'=E_a=E_y\cos s+E_x\sin s. \quad (6)$$

But $E_r$ and $E_a$ are the gain and phase errors of the received signals respectively (if E is much less than A and B) and therefore the gain and phase errors g and m may be expressed as $$g=E_xP_x-E_yP_y;\text{ and} \quad (7)$$

$$m=E_yP_x30\ E_xP_y \quad (8)$$

where $$P_x=\cos s;\text{ and} \quad (9)$$

$$P_y=\sin s. \quad (10)$$

These variables are dynamically used by the phase correct circuit 20 and gain correct circuit 22 to minimize the effects of the error in the received signals.

Figure 5:
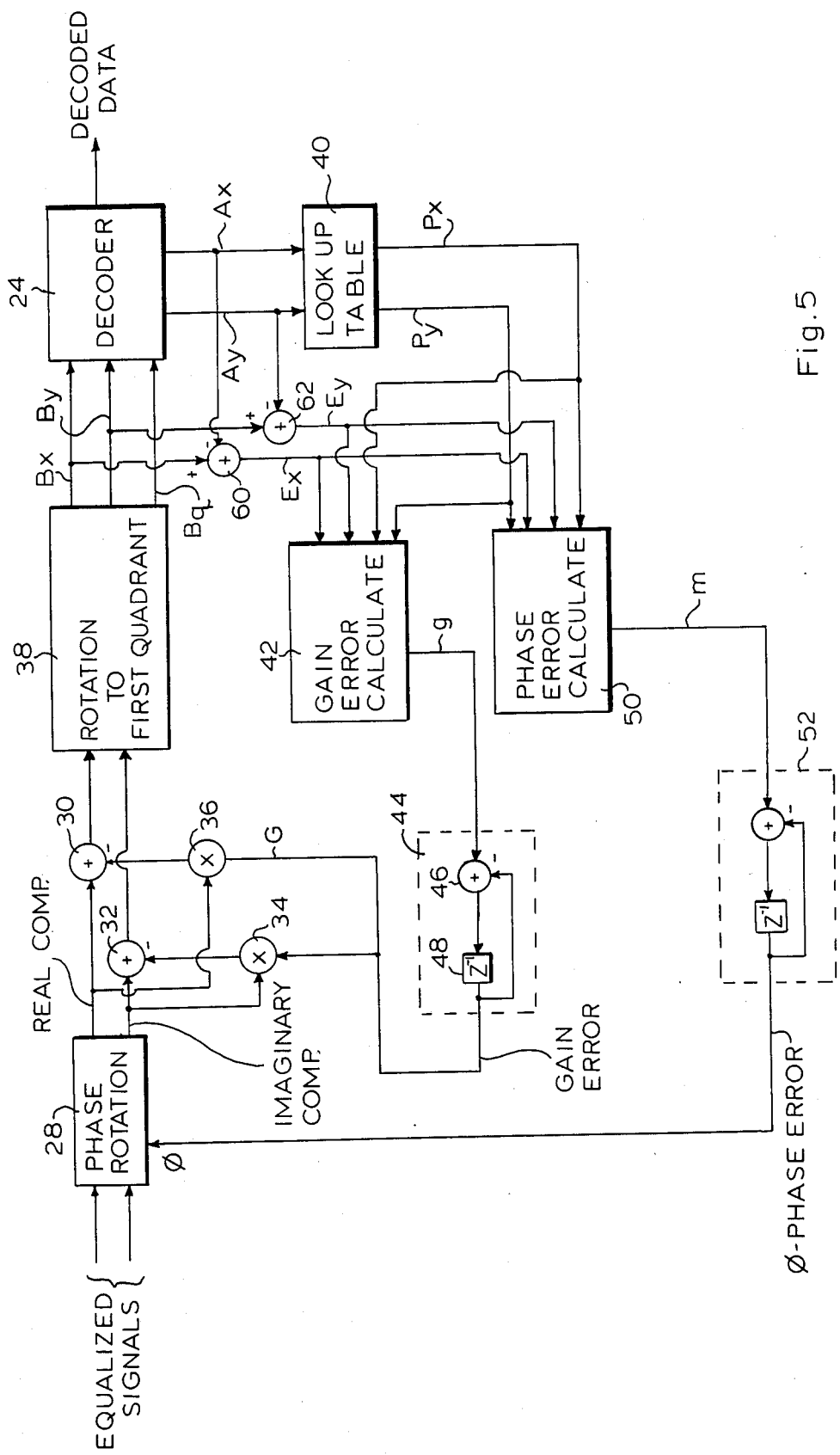
FIG. 5 shows details of the receiver modem of FIG. 1.

A means of implementing the phase and gain error circuits is shown in FIG. 5. The real and imaginary components of the equalized signals from equalizer 18 are fed to a phase rotation circuit 28. Circuit 28 rotates the equalized signals by an angle. The real and imaginary components are fed respectively to summer 30 and 32, and to multipliers 34 and 36 as shown. In multipliers 34 and 36 the respective components are multiplied by the gain error signal G and the respective products are then subtracted from the equalized components by summers 30 and 32 respectively. The outputs of summers 30 and 32 comprise the gain-corrected real and imaginary components of the signals and they are fed into a circuit 38 provided to rotate said signals to the first quadrant. Circuit 38 has three outputs, the first quadrant real and imaginary components of the rotated signals and a signal indicative of the original input signals received from summers 30 and 32. For example if the input to circuit 28 is signal $-3-4j$, then $B_x=3$; $B_y=4$ and $B_q=3$ (indicating a signal in the third quadrant). These signals are fed to decoder 24 which recognizes the received signal B as corresponding to ideal signal A because it (signal B) lies within the decision area 31 of FIG. 2. In response to the input signals, the decoder 24 generates a stream of data bits in accordance with the preselected encoding scheme used by transmit modem 10. The method of operation of decoder 24 is well known in the art and need not be described in more detail. The decoder also provides the real and imaginary components of ideal vector A, i.e. $A_x$ and $A_y$ to a look-up table 40 which in response generates corrector constants $P_x$ and $P_y$ defined above. Alternatively $P_x$ and $P_y$ may be calculated by using their formulas (9) and (10) however it was found that the use of look-up tables is more efficient.

The real and imaginary equalizer error components, $E_x$ and $E_y$ respectively, are computed via subtractors 60 and 62 in accordance with equation (1) and (2).

Constants $P_x$ and $P_y$ and the error signals $E_x$ and $E_y$ are fed to a gain error calculate circuit 42 which calculates an instantaneous gain error g in accordance with equation (7). Preferably the instantaneous gain error g is fed to an integrator circuit 44 provided to smooth the instantaneous gain. The integrator circuit comprises a summer 46 and a sample-and-hold element 48. The output of the sample-and-hold element provides a negative feed-back through summer 46 as shown. The integrated gain error signal G is used as one of the inputs of multipliers 34 and 36, as previously described.

In addition, $E_x$, $E_y$, $P_x$, and $P_y$ are also fed to phase calculate circuit 50 which calculates the instantaneous phase error in accordance with equation (8). A second integrator 52 is used to smooth the output m of circuit 50. The output $\phi$ of the integrator 52 is used to correct the phase of the equalized signals in circuit 28 as previously described.

The present invention was found to eliminate errors due to radial type disturbances such as harmonic distortions, amplitude modulation and gain disturbances which generally have a fast rate of change so that they cannot be tracked by the automatic gain controller. In actual tests it has been found that gain changes with rise time of 5 msec and an amplitude of 2 db are automatically corrected by the present invention. Furthermore error signals causing an amplitude modulation of 10-11% at 60 Hz did not interfere with the modem constructed in accordance with this invention. Modems without the gain tracker described herein were found to be unable to handle this type of signal.

It is clear that one skilled in the art could perform numerous modifications and additions to the invention as described above without departing from its scope as defined in the appended claims.

We claim:

1. In a modem for receiving a QAM encoded data signal which corresponds to a received vector, and having a decoder adapted to generate an ideal vector corresponding to said received vector, an error corrector comprising:

means for obtaining the radial component in the direction of said ideal vector of an error vector, said error vector being a difference vector between said received and ideal vectors;

means for obtaining a gain error signal determined by said radial component; and first means for modifying said received vector in accordance with said gain error signal.

2. The error of claim 1 further comprising means for obtaining the tangential component of said error vector, means for obtaining an angular error signal corresponding to said tangential component, and means for modifying said received vector in accordance with said angular error signal.

3. The error connector of claim 1 wherein said gain error signal is given by gain error signal $g=E_xP_x-E_yP_y$ where $E_x$ and $E_y$ are the real and imaginary components of the error vector;

$P_x=\cos s$;

$P_y=\sin s$;

s being an instantaneous phase angle of the ideal vector.

4. The error corrector of claim 3 wherein said phase error signal is given by:

phase error signal $=E_yP_x+E_xP_y$.

* * * * *